United States Patent
Martin

(10) Patent No.: US 9,721,371 B2
(45) Date of Patent: Aug. 1, 2017

(54) SYSTEMS AND METHODS FOR STITCHING METALLOGRAPHIC AND STEREOSCOPIC IMAGES

(71) Applicant: Caterpillar Inc., Peoria, IL (US)

(72) Inventor: Sam Martin, Oakley, IL (US)

(73) Assignee: Caterpillar Inc., Peoria, IL (US)

( * ) Notice: Subject to any disclaimer, the term of this patent is extended or adjusted under 35 U.S.C. 154(b) by 57 days.

(21) Appl. No.: 14/956,706

(22) Filed: Dec. 2, 2015

(65) Prior Publication Data
US 2017/0161927 A1    Jun. 8, 2017

(51) Int. Cl.
| | |
|---|---|
| G06T 11/00 | (2006.01) |
| G06T 11/60 | (2006.01) |
| G06K 9/62 | (2006.01) |
| G06K 9/46 | (2006.01) |
| G06K 9/72 | (2006.01) |

(52) U.S. Cl.
CPC ............ *G06T 11/60* (2013.01); *G06K 9/4671* (2013.01); *G06K 9/6224* (2013.01); *G06K 9/726* (2013.01); *G06T 2207/10016* (2013.01); *G06T 2207/10021* (2013.01); *G06T 2207/10056* (2013.01); *G06T 2207/20221* (2013.01); *G06T 2207/30136* (2013.01)

(58) Field of Classification Search
CPC .... G06K 9/726; G06K 9/6224; G06K 9/4671; G06T 11/60
See application file for complete search history.

(56) References Cited

U.S. PATENT DOCUMENTS

| | | | | |
|---|---|---|---|---|
| 6,755,537 B1 * | 6/2004 | Raskar | ..................... | H04N 5/74 348/383 |
| 8,345,961 B2 * | 1/2013 | Li | ......................... | G06T 7/593 348/42 |
| 8,509,565 B2 * | 8/2013 | Chen | .................... | G02B 21/008 382/128 |
| 2006/0104541 A1 * | 5/2006 | Baker | .................. | G06T 3/4038 382/284 |

(Continued)

FOREIGN PATENT DOCUMENTS

EP         2660845 A1    6/2013

*Primary Examiner* — Sean Motsinger
(74) *Attorney, Agent, or Firm* — Baker Hostetler

(57) ABSTRACT

A method includes receiving a first image and a plurality of other images of a planar surface of a specimen. The method also includes identifying first scale-invariant features in the first image. The first scale-invariant features are based on a scale-invariant feature transform of the first image. The method includes storing the first scale-invariant features in a grouping. The method includes, for each respective image of the plurality of other images, identifying scale-invariant features based on a scale-invariant feature transform of the respective image; matching the scale-invariant features to the grouping; based on the matching, determining a planar homography of the respective image with respect to the grouping; and adding the scale-invariant features of the respective image to the grouping. The method also includes stitching the first image and the plurality of other images into a composite image based on the planar homographies. A field of view of the specimen in the composite image is greater than a field of view of at least one of the first image or the plurality of other images.

20 Claims, 8 Drawing Sheets

(56) References Cited

U.S. PATENT DOCUMENTS

| | | | |
|---|---|---|---|
| 2008/0060034 A1* | 3/2008 | Egnal | G01C 11/02 725/105 |
| 2013/0044186 A1* | 2/2013 | Jin | G06T 7/20 348/46 |
| 2013/0044913 A1* | 2/2013 | Jin | G06T 7/20 382/103 |
| 2014/0105481 A1* | 4/2014 | Hasselbusch | G06T 7/0006 382/141 |
| 2014/0111607 A1* | 4/2014 | Scherling | H04N 5/23238 348/36 |
| 2014/0340475 A1* | 11/2014 | Furuhata | H04N 5/23238 348/39 |
| 2015/0124078 A1* | 5/2015 | Takahashi | G02B 21/367 348/80 |
| 2016/0086379 A1* | 3/2016 | Sadi | G06T 19/006 345/633 |
| 2016/0088287 A1* | 3/2016 | Sadi | H04N 19/54 348/43 |
| 2016/0142643 A1* | 5/2016 | Jiang | G06T 5/006 348/598 |
| 2016/0142644 A1* | 5/2016 | Lin | H04N 5/23238 348/143 |
| 2016/0150211 A1* | 5/2016 | Hwang | G06T 3/0093 348/43 |
| 2016/0163022 A1* | 6/2016 | Peleg | G11B 27/00 382/294 |
| 2016/0286137 A1* | 9/2016 | Marks | G06T 3/4038 |
| 2017/0034434 A1* | 2/2017 | Zhang | H04N 5/23229 |
| 2017/0068840 A1* | 3/2017 | Chaki | G06K 9/00201 |

\* cited by examiner

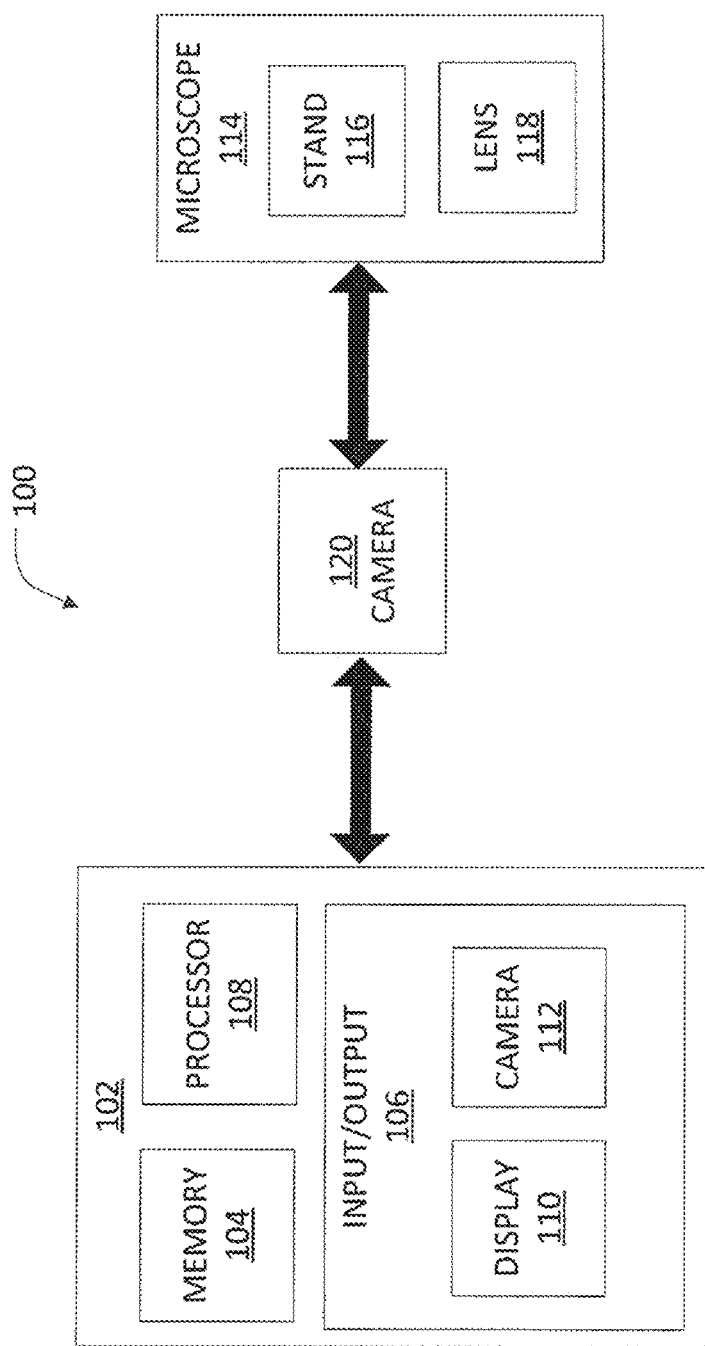

SYSTEMS AND METHODS FOR STITCHING METALLOGRAPHIC AND STEREOSCOPIC IMAGES

TECHNICAL FIELD

The present disclosure generally relates to image processing. More particularly, the present disclosure relates to systems and methods for stitching metallographs and stereoscopic images to extend the field of view.

BACKGROUND

Often, image stitching is used to combine multiple images with overlapping fields of view into a single image. The product of image stitching often has an increased field of view or increased resolution compared to an individual image that was used as a basis for creating the stitched image. Image stitching applications include panoramic images, image stabilization, maps created from satellite imagery, and the like. Image stitching often requires nearly exact overlaps between images to produce seamless results. Thus, automated methods and processes may be used to identify the overlaps between multiple images. The larger the number of images to be stitched, the greater the chance for error.

In "Automatic Panoramic Image Stitching Using Invariant Features," (the Brown Article) the authors Matthew Brown and David G. Lowe propose processes to fully automate two-dimensional stitching, or multi-row stitching, of images to create a panoramic image. Feature-based matching methods, such as correlation of image patches around Harris corners, lack the invariance properties needed to enable reliable matching of arbitrary panoramic image sequences. Thus, the Brown article proposes correlating scale-invariant feature transform (SIFT) features between images using pairwise homographies based on the spherical coordinates of the locations of SIFT feature in two images. The homographies provide a relative rotation between the cameras used for the images and are used to stitch the images together. However, the stitched image does not accurately represent the panorama, as the homographies do not account for an unknown 3D rotation to a world coordinate frame. Thus, only after a global rotation is applied to the stitched images do the stitched images match to the captured scene.

However, the processes disclosed in the Brown Article with response to panoramic imagery may not translate well when applied to metallographs or stereoscopic images. Specifically, use of these processes disclosed in the article may introduce specific errors when applied to images of a planar surface captured by a camera having a narrow depth of focus. For example, using the spherical coordinate system to stitch together images of a flat surface may introduce inaccurate curving when stitching the images together. Further, while mapping stitched mages to a global coordinate system is necessary to straighten panoramic images, this additional step may unnecessarily complicate stitching of images of planar surfaces of the specimen, wasting both time and processing power. These and other shortcomings of the prior art are addressed by the present disclosure.

SUMMARY

In an aspect, a method may include receiving a first image and a plurality of other images of a planar surface of a specimen. The method may also include identifying first scale-invariant features in the first image. The first scale-invariant features may be based on a scale-invariant feature transform of the first image. The method may include storing the first scale-invariant features in a grouping. The method may include, for each respective image of the plurality of other images, identifying scale-invariant features based on a scale-invariant feature transform of the respective image; matching the scale-invariant features to the grouping; based on the matching, determining a planar homography of the respective image with respect to the grouping; and adding the scale-invariant features of the respective image to the grouping. The method may also include stitching the first image and the plurality of other images into a composite image based on the planar homographies. A field of view of the specimen in the composite image may be greater than a field of view of at least one of the first image or the plurality of other images.

In another aspect, a device may include an input and a processor communicatively coupled to the input. The device may also include memory storing instructions that, when executed by the processor, cause the processor to effectuate operations. The operations may include receiving a first image and a plurality of other images of a planar surface of a specimen via the input. The method may include identifying first scale-invariant features in the first image. The first scale-invariant features may based on a scale-invariant feature transform of the first image. The method may also include storing the first scale-invariant features in a grouping. The method may include, for each respective image of the plurality of other images, identifying scale-invariant features based on a scale-invariant feature transform of the respective image; matching the scale-invariant features of the respective image to the grouping; based on the matching, determining a planar homography of the respective image with respect to the grouping; and adding the scale-invariant features of the respective image to the grouping. The method may also include stitching the first image and the plurality of other images into a composite image based on the planar homographies. The field of view of the specimen in the composite image may be greater than a field of view of at least one of the first image or the plurality of other images.

In yet another aspect, a system may include a microscope comprising a stage to receive a specimen and a camera having a lens having a planar depth of focus, the camera configured to capture images of the specimen. The system may include memory for storing a plurality of images captured by the camera and computer-executable instructions. The system may also include a processor that, when executing the computer-executable instructions, effectuates operations. The operations may include receiving a first image and a plurality of other images of a planar surface of the specimen and identifying first scale-invariant features in the first image. The first scale-invariant features may be based on a scale-invariant feature transform of the first image. The operations may include storing the first scale-invariant features in a grouping. The operations may also include, for each respective image of the plurality of other images, identifying scale-invariant features based on a scale-invariant feature transform of the respective image; matching the scale-invariant features of the respective image to the grouping; based on the matching, determining a planar homography of the respective image with respect to the grouping; and adding the scale-invariant features of the respective image to the grouping. The operations may also include stitching the first image and the plurality of other images into a composite image based on the planar homographies. A field of view of the specimen in the composite image may be greater than a field of view of at least one of the first image or the plurality of other images.

Other features and aspects of this disclosure will be apparent from the following description and the accompanying drawings.

BRIEF DESCRIPTION OF THE DRAWINGS

FIG. 1 is a block diagram illustrating an exemplary system for capturing and stitching images together.

DETAILED DESCRIPTION

Figure 2A:
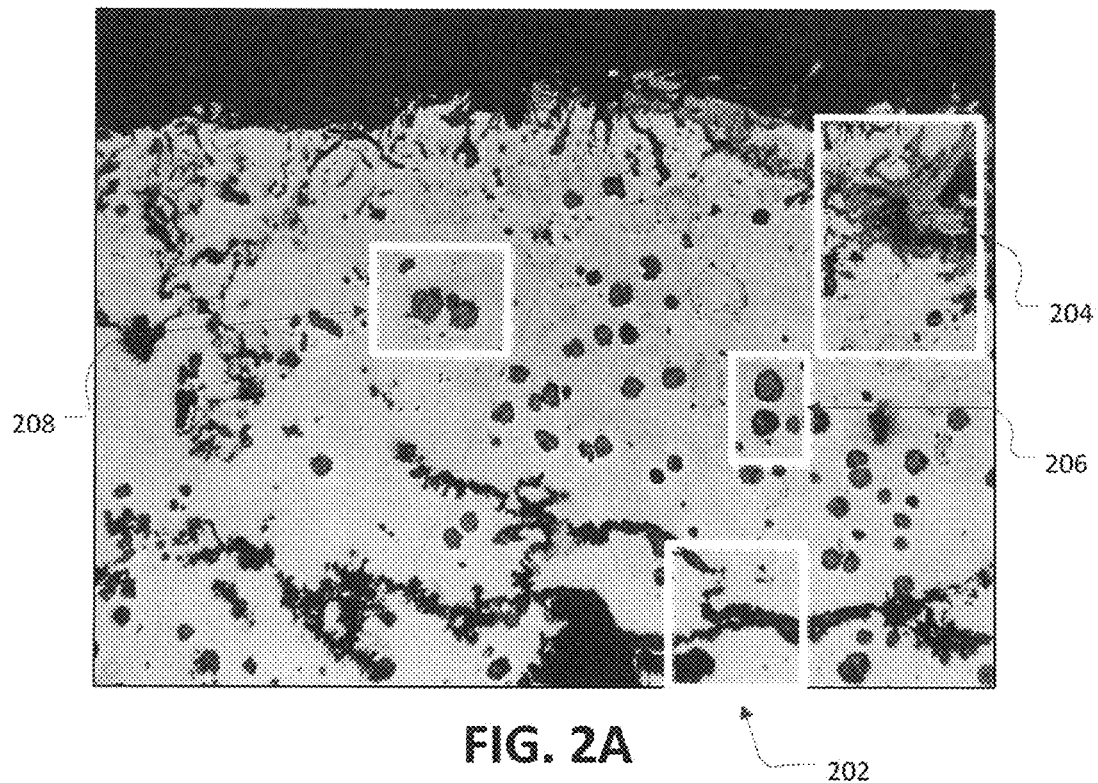
FIGS. 2A-F comprise images of a specimen.

Reference will now be made in detail to exemplary aspects, examples of which are illustrated in the accompanying figures. The following description refers to the accompanying drawings in which the same numbers in different drawings represent the same or similar elements when practical. The implementations set forth in the following description of exemplary embodiments do not represent all implementations consistent with the disclosure. Instead, they are merely examples of systems and methods consistent with aspects of the disclosure as recited in the appended claims.

FIG. 1 is a block diagram of an exemplary system 100 for capturing and stitching images together. The system 100 may include a device 102 that may be utilized to stitch multiple images from a stereoscope, microscope, or other camera as described herein. The device 102 may comprise or be incorporated into any appropriate device, including a stereoscope, a scanning electron microscope, a transmission electron microscope, an optical microscope, a spectrometer, a video camera, any other type of a camera, or the like. For example, any object embedded with hardware or software to enable the thing to process images may constitute the device 102.

The device 102 may comprise portions including a memory 104, an input/output 106, or a processor 108. Each portion of the device 102 may comprise circuitry for performing functions associated with each respective portion. Thus, each portion may comprise hardware or a combination of hardware and software. It is emphasized that the block diagram depiction of the device 102 is exemplary only and is not intended to imply a specific implementation or configuration.

The processor 108, memory 104, and input/output 106 may be coupled together (coupling not shown in FIG. 1) to allow communications therebetween. The input/output 106 may comprise a receiver, transmitter, or combination thereof, and the input/output 106 may be capable of receiving or providing information pertaining to image processing as described herein. In various configurations, the input/output 106 may receive or provide information via any appropriate means, such as, for example, optical means (e.g., infrared), electromagnetic means (e.g., radio frequency (RF), Wi-Fi, Bluetooth®, ZigBee®), acoustic means (e.g., speaker, microphone, ultrasonic receiver, ultrasonic transmitter), or a combination thereof. The input/output 106 may include a display input/output 110. For example, display input/output 110 may comprise a display that renders images for a user to view. The input/output 110 may include a camera input/output 112. For example, the camera input/output 112 may comprise a camera that captures one or more images that will be stitched together. Additionally or alternatively, the camera input/output 11 may comprise a wired or wireless connection to a separate hardware element comprising a microscope, a stereoscope, a camera, or the like. Additionally or alternatively, the input/output 106 may comprise a wired or wireless connection to a separate hardware element comprising a camera, such as a projector, a monitor, or the like.

The processor 108 may be capable of performing functions pertaining to image processing. In a basic configuration, device 101 may include at least one memory 104, which may comprise executable instructions that, when executed by the processor 108, cause the processor 108 to effectuate operations associated with image processing. The memory 104 may comprise a storage medium having a concrete, tangible, physical structure. As is known, a signal may not have a concrete, tangible, physical structure. The memory 104, as well as any computer-readable storage medium described herein, is not to be construed as a signal. The memory 104, as well as any computer-readable storage medium described herein, is not to be construed as a transient signal. Further, the memory 104, as well as any computer-readable storage medium described herein, is not to be construed as a propagating signal. The memory 104, as well as any computer-readable storage medium described herein, may be an article of manufacture.

The memory 104 may store any information utilized in conjunction with image processing. Depending upon the exact configuration or type of processor, the memory 104 may be volatile (such as some types of RAM), nonvolatile (such as ROM or flash memory), or a combination thereof. The device 102 may include additional storage (e.g., removable storage or nonremovable storage) including, but not limited to, tape, flash memory, smart cards, CD-ROM, DVD, or other optical storage, magnetic cassettes, magnetic tape, magnetic disk storage or other magnetic storage devices, universal serial bus (USB) compatible memory, or any other medium which can be used to store information and which can be accessed by the device 102.

In addition to the device 102, the system 100 may include a microscope 114 having a stand 116 that may be configured to accept or hold a specimen to be observed by or through the microscope 114. For example, the microscope 114 may include a lens 118 to view a specimen on the stand 116. Optionally, the microscope 114 may include or be connected to a camera 120 for capturing images through the lens 118. The camera 120 may comprise a video camera, a camera configured to periodically capture images, or any other type of camera. The images captured by the camera 120, or derived from the video feed of the camera, may be stored on the memory 104, as discussed above. The memory 104 may be communicatively coupled to processor 102. The memory 104 may store computer-executable instructions. The processor 108 may perform one or more operations by executing the computer-executable instructions to stitch together multiple images captured by the lens 118 and the camera 120 of a specimen into a composite image. For example, the processor 108 may conduct a recursive method of identifying features of the images, preparing a homography of the image compared to a grouping, and adding the features of the images to the grouping. In this manner, for N number of images, the processor 108 may prepare N number of homographies. The homographies indicate a relationship of the image to the grouping of data. As an example, the third image may have a homography that illustrates a relationship of the third image to the features found in the first image and the second image. Then, the features of the third image are added to the grouping, so the homography of a fourth image may illustrate a relationship of the fourth image to the features found in the first, second, and third images.

FIGS. 2A-2G illustrate an exemplary application of the functionality of system 100 to stitch together images of a specimen. FIGS. 2A-2F each comprise an image of a planar surface of a specimen. The specimen may be a metal sample, material, or composition, such as those used in metallography, ceramography, plastography, or materialography. In an aspect, the specimen may be any physical object. In an aspect, the specimen may be polished. Additionally or alternatively, the specimen may be exposed to certain methods (e.g., etching) or materials (e.g., corrosive materials) that may indicate the specimen's performance, such as performance under wear, high temperatures, low temperatures, temperature changes, corrosion, oxidation, or any other environment. A surface of the specimen is planar if the surface is captured by via the lens 206 of the microscope 202. Optionally, a planar surface may lie within a plane. A planar surface may have a variation in height of less than 1 cm. That is, the vertical distance (e.g., a distance perpendicular from the surface) from the lowest point of the planar surface and the highest point of the planar surface may be less than 1 centimeter. In another aspect, a planar surface may have a variation in height of less than 1 millimeter. In yet another aspect, a planar surface may have a variation in height of less than 100 microns. In yet another aspect, a planar surface may have a variation in height of less than 10 microns. In yet another aspect, a planar surface may have a variation in height of less than 1 micron.

Each image of FIGS. 2A-2F at least partially overlaps with at least one other image. This can be deduced, for example, by identifying features. In this example, a first feature 202 is located in at least FIGS. 2A, 2B, 2C, and 2D. Further, a second feature 204 is located in at least FIGS. 2B, 2C, 2D, and 2F. Scale-invariant features, such as the first and second features 202 and 204, may be used to determine relationship(s) among the images of FIGS. 2A-2F. These relationships may be used to stitch the images of FIGS. 2A-2F into a composite image, such as that illustrated in FIG. 2G. Reference to FIGS. 2A-2G may be made throughout the following description as an example.

Figure 3:
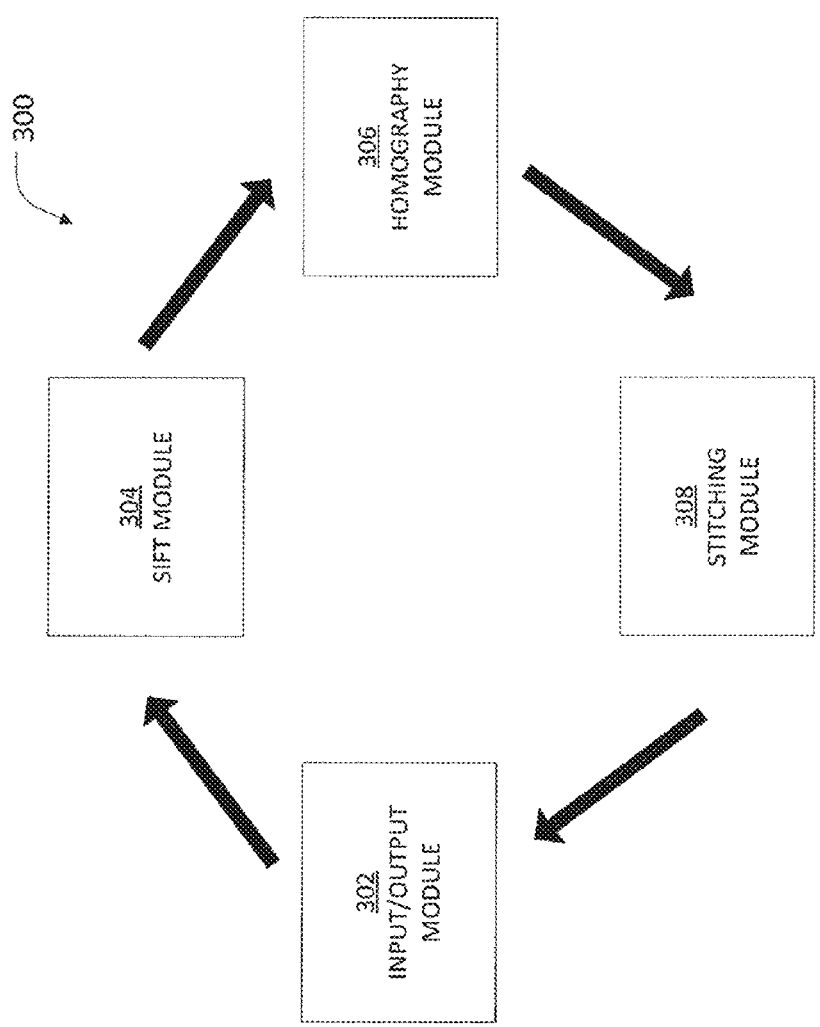
FIG. 3 is an exemplary data flow associated with capturing and stitching images together.

FIG. 3 illustrates an exemplary data flow 300 for receiving and processing images to create a composite image. The data flow 300 may be implemented by the system 100. The data flow 300 may include an input/output (I/O) module 302, a scale-invariant feature transform (SIFT) module 304, a homography module 306, and a stitching module 308. While the arrows illustrating flow of data are unidirectional, in an aspect, the data may be bidirectional.

The I/O module 302 may receive data indicative of a first image and a plurality of other images, such as the images of FIGS. 2A-2F, of a planar surface of a specimen. In an aspect, the data may be data from a video feed, and the images may be derived from screenshots of the video. The images may be received from, for example, the camera 208. In an aspect, the images are captured via the lens 206 of the microscope 202. The images may be of different views of a specimen. The images may be overlapping, such that at least a portion of the specimen captured in each image is also captured in at least one other image. In an aspect, images that do not have any overlap with any other images may be discarded. The images may be based on visible light or infrared light. Any type of imaging, including thermal imaging, X-ray imaging, and magnetic resonance imaging, or the like, may be used.

The I/O module 302 may provide data indicative of the first image to the SIFT module 304. The SIFT module 304 may be able to identify SIFT features in images regardless of any variation of scale, rotation, noise, or lighting between two or more images. The SIFT module 304 may process the first image (e.g., the data indicative of the images) using one or more algorithms, such as the SIFT algorithm described in U.S. Pat. No. 6,711,293, to identify features in the images. The first image may be any one of the images. For example, the first image may be a test image identified by a user, the image with the best illumination, or the like. Once these features are extracted from each image, then SIFT features may be stored in a grouping.

The SIFT module 304 may receive data indicative of the second image from the I/O module 302. The SIFT module 304 may identify the SIFT features of the second image. Based on the SIFT features from the second image and the grouping, the SIFT module may match common features between the second image and the grouping. Matching of images containing the same SIFT features may be performed using one or more search methods, such as the k-d tree algorithm or the best-bin-first method. The results may be filtered or refined based on further data processing, such as by applying probabilistic algorithms, or setting thresholds or limits for the number of features or search parameters. For example, the matching may be limited to finding a certain number of nearest-neighbors for each feature.

Based on the data provided by the SIFT module 304, the homography module 306 may identify a homography between the second image and the grouping. Specifically, the homography module 306 may compare the SIFT features of the second image with the SIFT features in the grouping to find common features. Using the locations of the common features, the homography module 306 may determine a homography. Identifying the features and the homography can be done with any number of matrix-based algorithms, such as cv2.findHomography( ) in OpenCV-Python.

Once the homography associated with the second image is defined, then the homography may be optimized. Optimizing the homography is based on the coordinates of the features in both the second image and the grouping. If the homography were applied to the second image, then there may be a small error in the location of the features as compared to the coordinates of those same features in the grouping, called pairwise errors. Thus, optimizing introduces subtle adjustments to the homography to decrease the size of the pairwise errors.

The features of the second image are then added to the grouping, and the process of identifying features, calculating the homography, optimizing the homography, and adding the feature of the next image to the grouping repeats until there are no other images to process.

The homography module 306 provides the optimized homographies to the stitching module 308. Since the planar homography is the relationship between those two images as well as the relationship of those two images to the planar surface of the specimen, this relational data may be used to stitch two images together. The stitching module 308 may build masks based on each image to combine the images into a stitched composite image. The mask, for example, may be defined such that the image for which the feature is closest to the center of the image may be the image used to illustrate that feature in the composite image. At the points where images overlap, a number of blending methods may be used.

For example, the composite image may simply remove any portions of images that overlap with another image that has been selected to illustrate the particular feature. Additionally or alternately, the images may be blended using pyramid blending (e.g., Laplacian pyramid blending), multiband blending, or other types of blending algorithms.

The composite image may be an image of a specimen, such as imagery of a substance. For example, the composite image may be a metallograph. Once the composite image has been created, the homography module 306 may provide the composite image to the I/O module 302. The I/O module 302 may display the stitched image or transfer the composite image to another device.

Figure 4:
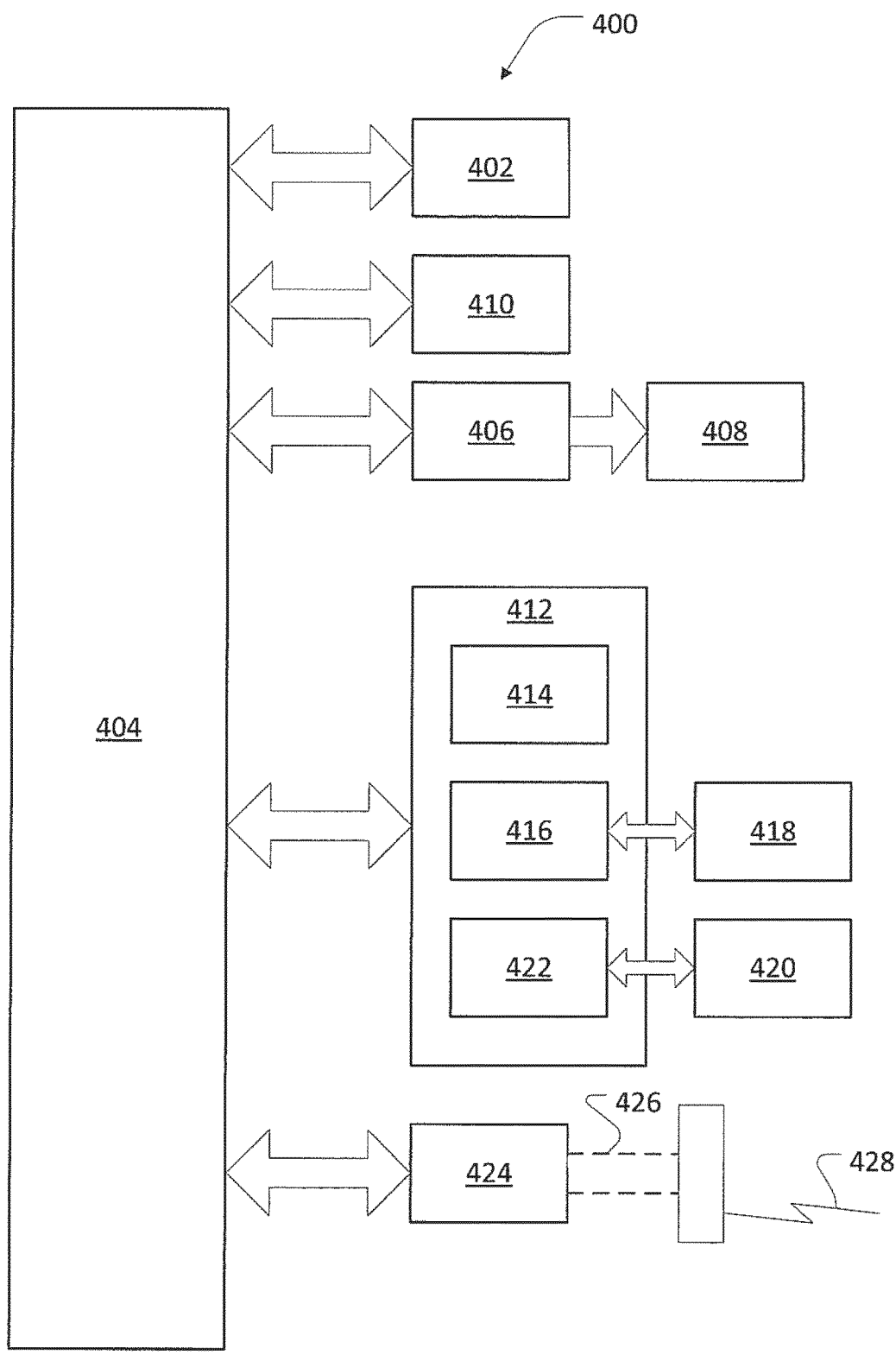
FIG. 4 is a block diagram of an exemplary computer system, according to an aspect of the present disclosure.

FIG. 4 illustrates a computer-based system 400 that may constitute or include parts of device 100 or system 200. The computer-based system 400 includes at least one processor, such as a processor 402. The processor 402 may be connected to a communication infrastructure 404, for example, a communications bus, a cross-over bar, a network, or the like. Various software aspects are described in terms of this example computer-based system 400. Upon perusal of the present description, it will become apparent to a person skilled in the relevant art(s) how to implement the present disclosure using other computer systems or architectures.

The computer-based system 400 includes a display interface 406 that forwards graphics, text, or other data from the communication infrastructure 404 or from a frame buffer (not shown) for display on a display unit 408.

The computer-based system 400 further includes a main memory 410, such as random access memory (RAM), and may also include a secondary memory 412. The secondary memory 412 may further include, for example, a hard disk drive 414 or a removable storage drive 416, representing a floppy disk drive, a magnetic tape drive, an optical disk drive, etc. The removable storage drive 416 reads from or writes to a removable storage unit 418 in a well-known manner. The removable storage unit 418 may represent a floppy disk, magnetic tape, or an optical disk, and may be read by and written to by the removable storage drive 416. As will be appreciated, the removable storage unit 418 includes a computer usable storage medium having computer software or data stored therein.

In accordance with various aspects of the present disclosure, the secondary memory 412 may include other similar devices for allowing computer programs or other instructions to be loaded into the computer-based system 400. Such devices may include, for example, a removable storage unit 420, and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit 420 to the computer-based system 400.

The computer-based system 400 may further include a communication interface 424. The communication interface 424 may allow software or data to be transferred between the computer-based system 400 and external devices. Examples of the communication interface 424 include, but may not be limited to a modem, a network interface (such as an Ethernet card), a communications port, a Personal Computer Memory Card International Association (PCMCIA) slot and card, or the like. Software or data transferred via the communication interface 424 may be in the form of a number of signals, hereinafter referred to as signals 426, which may be electronic, electromagnetic, optical or other signals capable of being received by the communication interface 424. The signals 426 may be provided to the communication interface 424 via a communication path (e.g., channel) 428. The communication path 428 carries the signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as the removable storage drive 416, a hard disk installed in the hard disk drive 414, or the like. These computer program products provide software to the computer-based system 400. The present disclosure is directed to such computer program products.

Computer programs (also referred to as computer control logic) may be stored in the main memory 410 or the secondary memory 412. The computer programs may also be received via the communication interface 404. Such computer programs, when executed, enable the computer-based system 400 to perform the functions consistent with the present disclosure, as discussed herein. In particular, the computer programs, when executed, enable the processor 402 to perform the features of the present disclosure. Accordingly, such computer programs represent controllers of the computer-based system 400.

In accordance with an aspect of the present disclosure, where the disclosure is implemented using a software, the software may be stored in a computer program product and loaded into the computer-based system 400 using the removable storage drive 416, the hard disk drive 414, or the communication interface 424. The control logic (software), when executed by the processor 402, causes the processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The disclosed systems and methods provide a robust system for stitching together multiple images captured by a microscope to create a composite image. The composite image may have a number of benefits. For example, by stitching together multiple images, the composite image may have a greater field of view of the specimen than if the specimen was only captured by a single image. Additionally or alternatively, the composite image may illustrate more of the specimen with a higher resolution or quality than a single image may have been able to capture of the specimen. The disclosed systems and methods provide an improvement to metallography.

Figure 5:
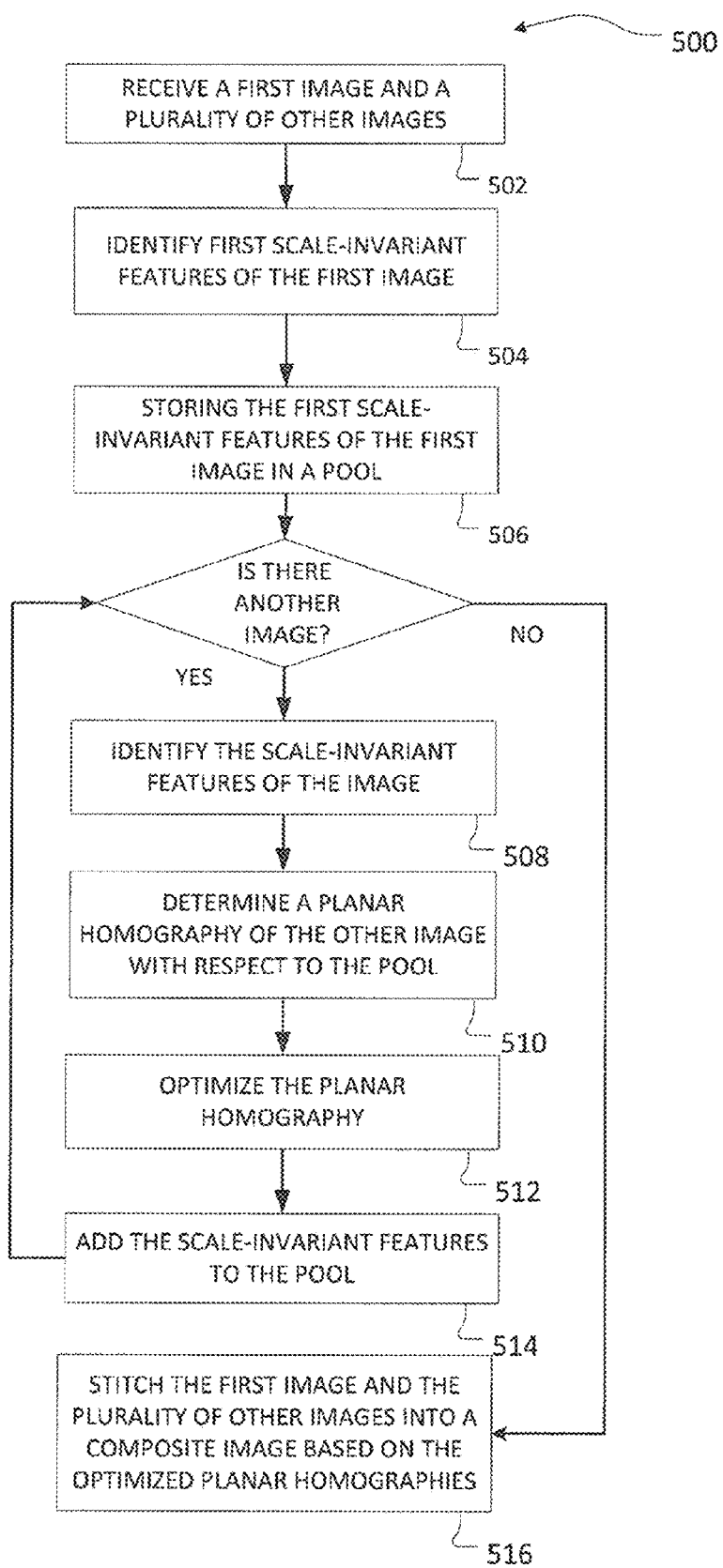
FIG. 5 is a flowchart of an exemplary method for stitching multiple images.

FIG. 5 is a flowchart of a method 500 to stitch together images. The method may be performed by one or more components. For example, the device 102, system 100, or computer-based system 400 may perform all or some of the method 500.

At step 502, the method may include receiving images of a specimen having a planar surface. For example, the specimen may be a metal sample, material, or composition, such as those used in metallography, ceramography, plastography, or materialography. In an aspect, the specimen may be polished. Additionally or alternatively, the specimen may be exposed to certain methods (e.g., etching) or materials (e.g., corrosive materials) that may indicate the specimen's performance, such as performance under wear, high temperatures, low temperatures, temperature changes, corrosion, oxidation, or any other environment. As an example, step 502 may comprise receiving images of FIGS. 2A-2F. The exemplary images of FIGS. 2A-2F are of a single specimen. The specimen in FIGS. 2A-2F may be polished and etched, resulting in the patterns on the surface of the specimen.

The images may be received from, for example, the camera 208, which optionally may have a planar depth of focus. In an aspect, the images are captured using the lens 206 of the microscope 202. The images may be of a single specimen or of multiple specimens. Additionally or alternatively, the images may be of different views of a specimen. At least a portion of the images may partially or wholly overlapping overlapping, such that at least a portion of the specimen captured in each image is also captured in at least one other image. In an aspect, images that do not have any overlap with any other images may be discarded. The images may be based on visible light or infrared light. Any type of imaging, including thermal imaging, X-ray imaging, and magnetic resonance imaging, or the like, may be used. One or more of the received images may be raw video data. The raw video data may be received from a video feed; for example, the camera 120 may be a video camera, and the camera input 112 may receive raw video data generated or collected by the camera 120. If the method 500 includes receiving raw video data, step 502 may include capturing screenshots from the raw video data. One or more of these screenshots may comprise one or more of the plurality of images.

At step 504, method 500 may include performing a scale-invariant feature transform of the first image. The scale-invariant feature transform may include a SIFT algorithm, such as that described in U.S. Pat. No. 6,711,293, to identify features in the first image. The first image may be selected by any number of ways (e.g., first-in, last-in, random, user-input, etc.) For example, the first image may be an image identified by a user, the image with the best illumination, the image with the highest contrast, or the like. As another example, the method 500 may include performing the scale-invariant feature transform on a portion or all of the images, and the first image may be identified as the image with the greatest number of scale-invariant features. Once the first image is identified, the features of the first image can be stored in a data grouping. In this manner, the first image may be based on which image has a certain number of features, a certain overlap, or the any other analysis of the features within each image. Each feature may include a feature descriptor and a coordinate location of the feature within the first image. For example, referring to the image in FIG. 2A, the features may include features 202, 204, 206, 208, as designated by the white rectangles in the figure. In an aspect, each feature within an image may be the same size as the other features in the image. In another aspect, the size of the features in an image may vary. Further, the number of features may vary. While the image in FIG. 2A is shown with four features, the number of features may be very large (e.g., thousands of features). The number of features in FIG. 2A is exemplary only. For example, a scale-invariant feature transform of FIG. 2A may uncover hundreds or thousands of features, and the features 202-208 are meant to be exemplary only, as these features may be perceived by the reader, such that a reader may understand how images may share common features.

At step 506, the first scale-invariant features (e.g., the scale-invariant features of the first image) may be stored a grouping. The grouping may be any data storage device, such as a database, a matrix, or the like. The grouping may store the feature descriptor and the coordinates of the location of that feature within the first image. The feature descriptor may be any identifier (e.g., number, name, description), and the coordinates would indicate the location of the feature 202 right of the lower center of the image in FIG. 2A.

Steps 508-514 pertain to the plurality of other images received in step 502. For example, step 508 may include identifying the scale-invariant features of another image, such as the image in FIG. 2B. As will be evident, step 508 may be fully or partially performed in conjunction with step 504. For the image in FIG. 2B, step 508 may comprise identifying features 202, 204, 208, and 210. As is clear from comparing the features of FIG. 2B with the features of FIG. 2A, these two images are at least partially overlapping; they both contain features 202, 204, and 208. Using the data stored in the grouping in step 506, as well as the feature data of the image of FIG. 2B identified in step 508, step 510 may include determining a planar homography of the image of FIG. 2B with respect to the data in the grouping. In this example, this may comprise determining a planar homography based on the features in FIG. 2A, as the grouping may contain only the features identified in step 504.

Figure 2B:
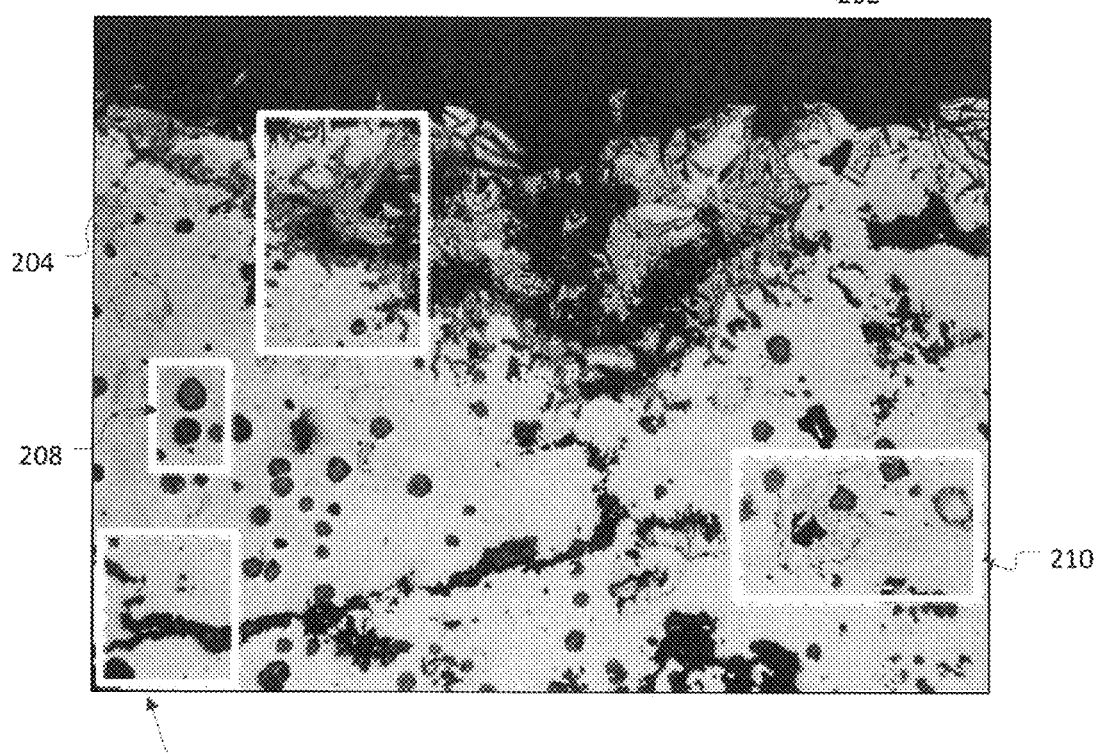

For the image in FIG. 2B, step 512 may include optimizing the planar homography of FIG. 2B with respect to FIG. 2A. As discussed above with respect to FIG. 3, the planar homography may be optimized by tweaking or adjusting the planar homograph to decrease an error, such as an inaccurate rotation. For example, if the image of FIG. 2B is rotated consistent with the planar homography identified in step 510, FIG. 2A and FIG. 2B may not align exactly. For example, the feature 204 of the rotated FIG. 2B may be off by a number of pixels (e.g., a pixel error) with respect the feature 204 of FIG. 2A. The planar homography may be adjusted such that the features 204 more closely align when FIG. 2B is rotated. That is, the pixel error of the homography may be decreased or eliminated by optimizing the planar homography.

For the image in FIG. 2B, step 514 may include adding the features 202, 204, 208, and 210 to the grouping. Thus, the grouping may include the features 202, 204, 206, 208, and 210, including the respective coordinates of these features in the images of FIG. 2A or 2B.

Figure 2C:
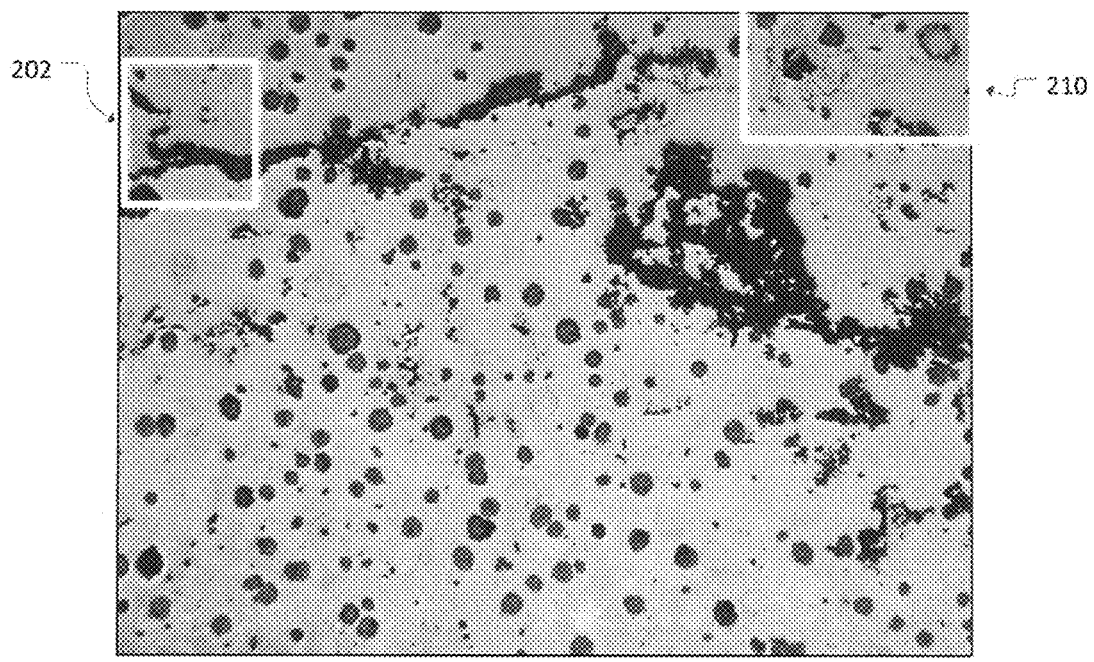
Figure 2D:
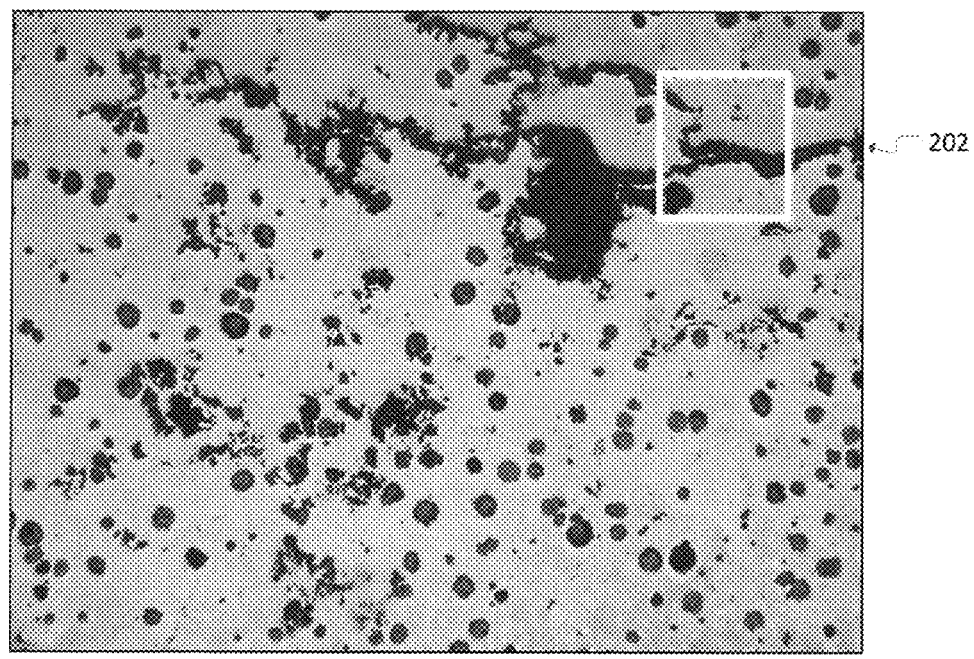
Figure 2E:
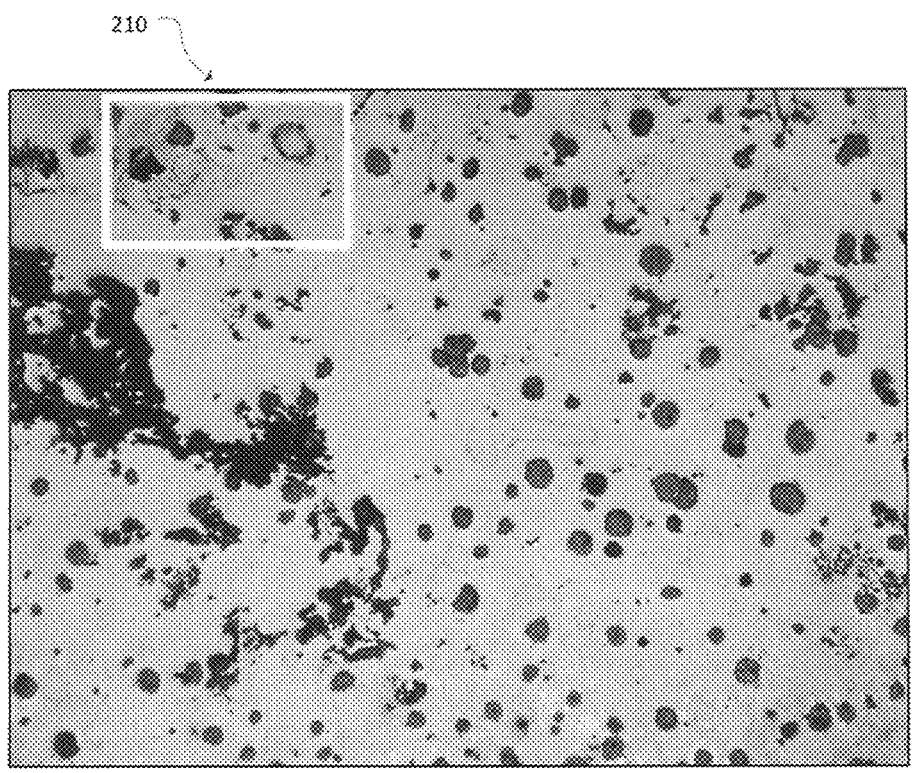
Figure 2F:
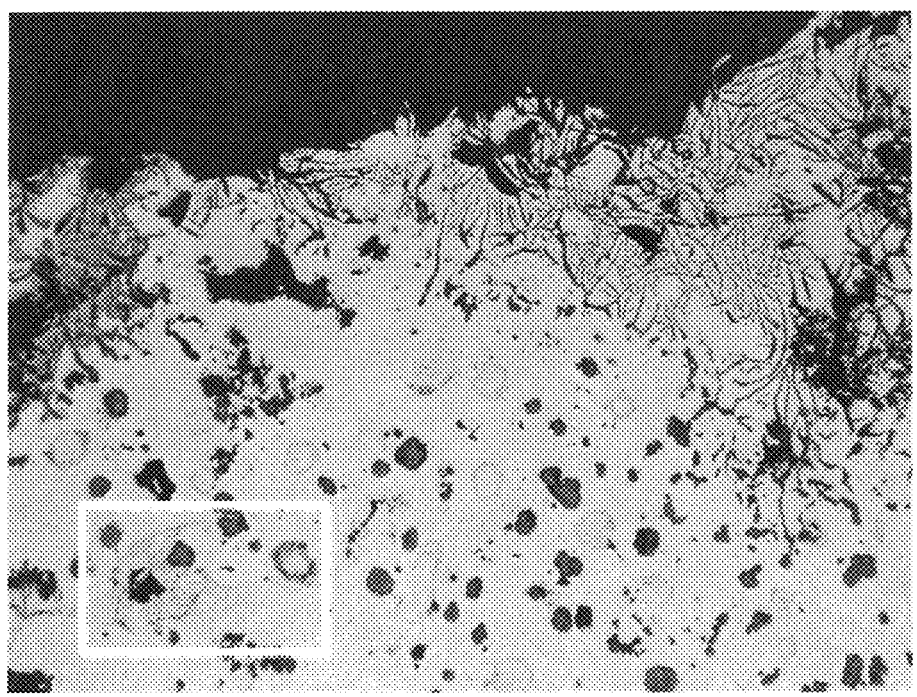

Steps 508-514 are repeated on every other image of the plurality of the images. That is, if the image of FIG. 2C is the next image to be processed, step 508 may include identifying the features 202 and 210 in the image of FIG. C. Step 510 for the image of FIG. 2C may include identifying a planar homography of the image of FIG. 2C with respect to the features in the grouping (e.g., the features of FIGS. 2A and 2B). The features of FIG. 2C may be added to the grouping. If the image of FIG. 2D is the next image to be processed, step 508 may include identifying the feature 202 in FIG. 2D, and step 510 may include identifying a planar homography of the image of FIG. 2D with respect to the features of FIGS. 2A, 2B, and 2C. The features of FIG. 2D may be added to the grouping. For the next image to be processed (e.g., the image of FIG. 2E), the method 500 may include determining a planar homography of the image of FIG. 2E (e.g., based on its feature 210) with respect to the features of FIGS. 2A-2D. To process the image of FIG. 2F, the method 500 may include determining a planar homography of the image of FIG. 2F (e.g., based on its feature 210) with respect to the features of FIGS. 2A-2E.

Step 516 of the method 500 may include stitching the images of FIGS. 2A-2F together to create a composite image. The step 516 may be based on applying the planar homographies identified in 510 (or the optimized planar homographies of 512) to the images. As an example, the product of step 516 may be the image of FIG. 2G.

Figure 2G:
FIG. 2G is a composite image based on the images of FIGS. 2A-F.

Optionally, the plurality of the images may be filtered at different stages in the method 500. For example, images that do not contain a threshold number of features may be excluded. Optionally, images may be filtered from the plurality of images based on any image characteristics, such as contrast, resolution, noise, or the like. Optionally, one or more steps may be performed on all of the images at substantially the same time. For example, the method 500 may include identifying the scale-invariant features of all of the images, prior to determining the first planar homography. For example, images may be filtered based on a lack of overlap with any of the other images (e.g., if none of the scale-invariant features of the image is shared by any of the other images). As another example, images that have too much overlap with one or more of the other images may be filtered. This may be done, for example, to filter out repetitive images (e.g., where two images capture the same field of view of the specimen). Images may be filtered out based on an inaccuracy of its homography or optimized homography. Further, images that are considered outliers may be filtered out. In this manner, less than all of the images received in step 502 may form the basis for the composite image created in step 516. Step 516 may include determining calibrated lens information of the lens used to capture the images, so that stitching the images includes performing a bundle adjustment of the images based on the calibrated lens information. The composite image of step 516 may have a field of view of the specimen that is the sum of each of the fields of view of the underlying images. That is, the image in FIG. 2G shows each portion of the specimen that is captured in one or more of the images of FIGS. 2A-2F.

Method 500 may include additional steps not illustrated in FIG. 5. For example, method 500 may include blending the images. For example, the blending may be based on the scale-invariant features. This may include pyramid blending techniques or multi-bland blending techniques.

The systems, methods and computer program products disclosed in conjunction with various aspects of the present disclosure are embodied in a systems and methods for combining or stitching multiple metallographs or stereoscopic images to increase the field of view of a sample.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special-purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

I claim:

1. A method comprising:
receiving a first image and a plurality of other images of a planar surface of a specimen;
identifying first scale-invariant features in the first image, the first scale-invariant features based on a scale-invariant feature transform of the first image;
storing the first scale-invariant features in a grouping;
for each respective image of the plurality of other images:
identifying scale-invariant features based on a scale-invariant feature transform of the respective image;
matching the scale-invariant features to the grouping;
based on the matching, determining a planar homography of the respective image with respect to the grouping; and
adding the scale-invariant features of the respective image to the grouping; and
stitching the first image and the plurality of other images into a composite image based on the planar homographies;
wherein a field of view of the specimen in the composite image is greater than a field of view of at least one of the first image or the plurality of other images.

2. The method of claim 1, further including blending the composite image based on at least one of the scale-invariant features.

3. The method of claim 2, wherein the blending includes pyramid blending.

4. The method of claim 1, further comprising reducing a pixel error of at least one of the planar homographies.

5. The method of claim 1, further comprising receiving the images of the specimen from a microscope.

6. The method of claim 1, wherein receiving the first image and the plurality of other images comprises:
receiving raw video data from a video feed; and
capturing screenshots from the raw video data, wherein each of the first image and the plurality of other images comprises a screenshot.

7. The method of claim 1, wherein of the first image and the plurality of other images, the first image comprises a greatest number of scale-invariant features.

8. The method of claim 1, further including
determining calibrated lens information of a lens used to capture each of the plurality of images,
wherein stitching each of the plurality of images together includes bundle adjustment based on the calibrated lens information.

9. A device comprising:
an input;
a processor communicatively coupled to the input; and
memory storing instructions that, when executed by the processor, cause the processor to effectuate operations comprising:
receiving a first image and a plurality of other images of a planar surface of a specimen via the input;
identifying first scale-invariant features in the first image, the first scale-invariant features based on a scale-invariant feature transform of the first image;
storing the first scale-invariant features in a grouping;
for each respective image of the plurality of other images:
identifying scale-invariant features based on a scale-invariant feature transform of the respective image;
matching the scale-invariant features of the respective image to the grouping;
based on the matching, determining a planar homography of the respective image with respect to the grouping; and
adding the scale-invariant features of the respective image to the grouping; and
stitching the first image and the plurality of other images into a composite image based on the planar homographies;
wherein a field of view of the specimen in the composite image is greater than a field of view of at least one of the first image or the plurality of other images.

10. The device of claim 9, further including a camera communicatively coupled to the input.

11. The device of claim 10, further including a microscope communicatively coupled to the camera.

12. The device of claim 9, wherein the operations further include blending each of the plurality of images based on at least one of the invariant features.

13. The device of claim 12, wherein the operations further include reducing a pixel error of at least one of the planar homographies.

14. The device of claim 9, wherein receiving the first image and the plurality of other images comprises:
receiving raw video data from a video feed; and
capturing screenshots from the raw video data, wherein each of the first image and the plurality of other images comprises a screenshot.

15. A system comprising:
a microscope comprising a stage to receive a specimen;
a camera having a lens having a planar depth of focus, the camera configured to capture images of the specimen;
memory for storing a plurality of images captured by the camera and computer-executable instructions; and
a processor that, when executing the computer-executable instructions, effectuates operations comprising:
receiving a first image and a plurality of other images of a planar surface of the specimen;
identifying first scale-invariant features in the first image, the first scale-invariant features based on a scale-invariant feature transform of the first image;
storing the first scale-invariant features in a grouping;
for each respective image of the plurality of other images:
identifying scale-invariant features based on a scale-invariant feature transform of the respective image;
matching the scale-invariant features of the respective image to the grouping;
based on the matching, determining a planar homography of the respective image with respect to the grouping; and
adding the scale-invariant features of the respective image to the grouping; and
stitching the first image and the plurality of other images into a composite image based on the planar homographies;
wherein a field of view of the specimen in the composite image is greater than a field of view of at least one of the first image or the plurality of other images.

16. The system of claim 15, wherein receiving the first image and the plurality of other images comprises:
receiving raw video data from a video feed; and capturing screenshots from the raw video data, wherein each of the first image and the plurality of other images comprises a screenshot.

17. The system of claim 15, wherein the operations further include:
    determining calibrated lens information of a lens used to capture each of the plurality of images,
    wherein stitching each of the plurality of images together includes bundle adjustment based on the calibrated lens information.

18. The system of claim 15, wherein the operations further include blending each of the plurality of images based on at least one of the invariant features.

19. The system of claim 15, wherein the operations further include reducing a pixel error of at least one of the planar homographies.

20. The system of claim 15, wherein the composite image is a metallograph.

* * * * *